US009641760B2

(12) United States Patent
LaScolea et al.

(10) Patent No.: US 9,641,760 B2
(45) Date of Patent: May 2, 2017

(54) IMAGE CAPTURE SYSTEM

(71) Applicant: Dealer Dot Com, Inc., Burlington, VT (US)

(72) Inventors: James LaScolea, Burlington, VT (US); Jesse Stein, South Burlington, VT (US); Michael McKennedy, Jericho, VT (US)

(73) Assignee: Dealer Dot Com, Inc., Burlington, VT (US)

( * ) Notice: Subject to any disclaimer, the term of this patent is extended or adjusted under 35 U.S.C. 154(b) by 606 days.

(21) Appl. No.: 13/755,901

(22) Filed: Jan. 31, 2013

(65) Prior Publication Data
US 2013/0201354 A1 Aug. 8, 2013

Related U.S. Application Data

(60) Provisional application No. 61/594,988, filed on Feb. 3, 2012.

(51) Int. Cl.
*H04N 5/262* (2006.01)
*H04N 5/232* (2006.01)
(Continued)

(52) U.S. Cl.
CPC ......... *H04N 5/23293* (2013.01); *G06F 3/005* (2013.01); *H04N 5/23222* (2013.01); *H04N 5/23229* (2013.01)

(58) Field of Classification Search
CPC . H04N 5/23293; H04N 5/23222; G06F 3/005
See application file for complete search history.

(56) References Cited

U.S. PATENT DOCUMENTS 6,606,117 B1   8/2003 Windle
7,391,445 B2 *  6/2008 Herberger ............. G06T 1/0007
                                                348/239
(Continued)

FOREIGN PATENT DOCUMENTS

EP   0901280 A2   3/1999
EP   1503581 A2 * 2/2005 ............. H04N 5/335

OTHER PUBLICATIONS

International Search Report and Written Opinion of the International Searching Authority.

*Primary Examiner* — Ngoc-Yen Vu
(74) *Attorney, Agent, or Firm* — James Marc Leas

(57) ABSTRACT

A method of taking an image of a scene that includes an item of interest, includes providing a digital imaging device having an imaging lens and a viewing screen and electronically providing an alignment feature on the viewing screen. The alignment feature is configured to allow a viewer to see both the alignment feature and an image of the item of interest on the viewing screen. The method includes adjusting at least one parameter from the group consisting of angular position of the digital imaging device with respect to the item of interest and angular orientation of the digital imaging device to achieve alignment of the image of the item of interest on the viewing screen with the alignment feature wherein the alignment feature has a structure so that the adjusting to achieve alignment restricts to exclusively one angular position of the digital imaging device with respect to the item of interest and exclusively one angular orientation of the digital imaging device. The method also includes capturing the image of the item of interest.

29 Claims, 6 Drawing Sheets

(51) Int. Cl.
*G06F 3/00* (2006.01)
*H04N 5/222* (2006.01)

(56) References Cited

U.S. PATENT DOCUMENTS

| | | | | |
|---|---|---|---|---|
| 7,551,211 | B2* | 6/2009 | Taguchi | H04N 5/272 |
| | | | | 348/239 |
| 7,639,897 | B2* | 12/2009 | Gennetten | H04N 5/232 |
| | | | | 348/36 |
| 8,059,183 | B2* | 11/2011 | Seto | H04N 1/6033 |
| | | | | 348/135 |
| 8,439,750 | B2* | 5/2013 | Kawamoto | A63F 13/655 |
| | | | | 463/30 |
| 9,087,269 | B2* | 7/2015 | Chinen | G06K 9/6267 |
| 9,479,693 | B2* | 10/2016 | Kang | H04N 5/23222 |
| 2002/0171746 | A1* | 11/2002 | Stephany et al. | 348/239 |
| 2005/0024517 | A1 | 2/2005 | Luciano | |
| 2005/0088542 | A1* | 4/2005 | Stavely et al. | 348/239 |
| 2006/0086797 | A1 | 4/2006 | Saito | |
| 2010/0042411 | A1 | 2/2010 | Addessi | |
| 2011/0090390 | A1 | 4/2011 | Narita | |

* cited by examiner

| FIG. 1bA |
|---|
| FIG. 1bB |
| FIG. 1bC |

FIG. 1b

52 — Create a set of vector based image overlays for the desired sequence of views using an image manipulation application such as Adobe products, such as Fireworks, or Pixelmator or any others. The image angles / perspectives / zoom levels etc... can be determined using libraries of existing stock photography as stencils baselines. 3D images / videos are also good stencils to start from to find the correct angle / perspective 53 — Export versions for various devices (such as iPad vs iPhone) as they have different aspect ratios, to fit overlays appropriately into the camera view, as PNG's or JPG's or whatever image type the plugin desires. Once complete, load them into App for plugin to use

FIG. 1bA

IMAGE CAPTURE SYSTEM

FIELD

This patent application generally relates to a programmable computer system for providing a set of images. More particularly, it relates to a system that creates a consistent set of images for members of a type of product. Even more particularly, it relates to a system that creates a natural sounding human voice recording describing products along with the corresponding consistent set of images.

BACKGROUND

The world wide web has provided the possibility of providing useful written, audio, and visual information about a product that is offered for sale, such as real estate, as described in "Automatic Audio Content Creation and Delivery System," PCT/AU2006/000547, Publication Number WO 2006/116796, to Steven Mitchell, et al, published 9 Nov. 2006 ("the '547 PCT application"). The '547 PCT application describes an information system that takes in information from clients and uses this information to automatically create a useful written description and matching spoken audible electronic signal, and in certain cases a matching visual graphical display, relating to the subject matter to be communicated to users. The information system transmits this information to users using various communications channels, including but not limited to the public telephone system, the internet and various retail ("in-store" or "shop window" based) audio-visual display units. A particular aspect of the '547 PCT application relates to an automated information system that creates useful written descriptions and spoken audio electronic signals relating to real estate assets being offered for sale or lease.

US Patent Application 2008/019845, "System and Method for Generating Advertisements for Use in Broadcast Media" to Charles M. Hengel et al, filed 3 May 2007 ("the '845 application), describes systems and methods for generating advertisements for use in broadcast media. The method comprises receiving an advertisement script at an online system; receiving a selection indicating a voice characteristic; and converting the advertisement script to an audio track using the selected voice characteristic.

Commonly assigned "Automatic Creation of Audio Files, U.S. Pat. No. 8,112,279, ("the '279 patent"), incorporated herein by reference, that will issue on Feb. 7, 2012, provides ways to automatically generate audio files and to combine them with images.

Applicants recognized that better schemes are needed to create video that can be automatically combined with the audio descriptions of products of the '279 patent, and such solutions are provided by the following description.

SUMMARY

One aspect of the present patent application is a method of taking an image of a scene that includes an item of interest. The method includes providing a digital imaging device having an imaging lens and a viewing screen, and electronically providing an alignment feature on the viewing screen. The alignment feature is configured to allow a viewer to see both the alignment feature and an image of the item of interest on the viewing screen The method includes adjusting at least one parameter from the group consisting of angular position of the digital imaging device with respect to the item of interest and angular orientation of the digital imaging device to achieve alignment of the image of the item of interest on the viewing screen with the alignment feature wherein the alignment feature has a structure so that the adjusting to achieve alignment restricts to exclusively one angular position of the digital imaging device with respect to the item of interest and exclusively one angular orientation of the digital imaging device. The method also includes capturing the image of the item of interest.

Another aspect is a method of building a description of a particular product of a class of products on a website, wherein the website is on a server. The method includes reading a code on the particular product and transmitting data derived from the reading. The method includes determining information about the particular product from the transmitted data. The method also includes selecting a plurality of alignment features based on the information. The method also includes providing a digital imaging device, wherein the digital imaging device includes a viewing screen. The method also includes providing an alignment feature on the viewing screen, adjusting location of the digital imaging device, and capturing an image of the particular product when the image of the particular product is aligned with the alignment feature and repeating the capturing an image of the particular product for the plurality of alignment features to obtain a plurality of images of the particular product. The method also includes transmitting the plurality of images of the particular product to a web site.

Another aspect is a non-transitory computer-usable medium having computer readable instructions stored thereon for execution by a processor to perform a method of building an audio-visual description of a particular product corresponding to one or both of the above methods.

BRIEF DESCRIPTION OF THE DRAWINGS

The foregoing will be apparent from the following detailed description, as illustrated in the accompanying drawings, in which:

FIGS. 2b, 3b are views of a screen of a digital image device showing examples of images of an actual vehicle positioned so they are overlapped by the ghost semi-transparent overlay structures of FIGS. 2a, 3a.

DETAILED DESCRIPTION

Figure 1A:
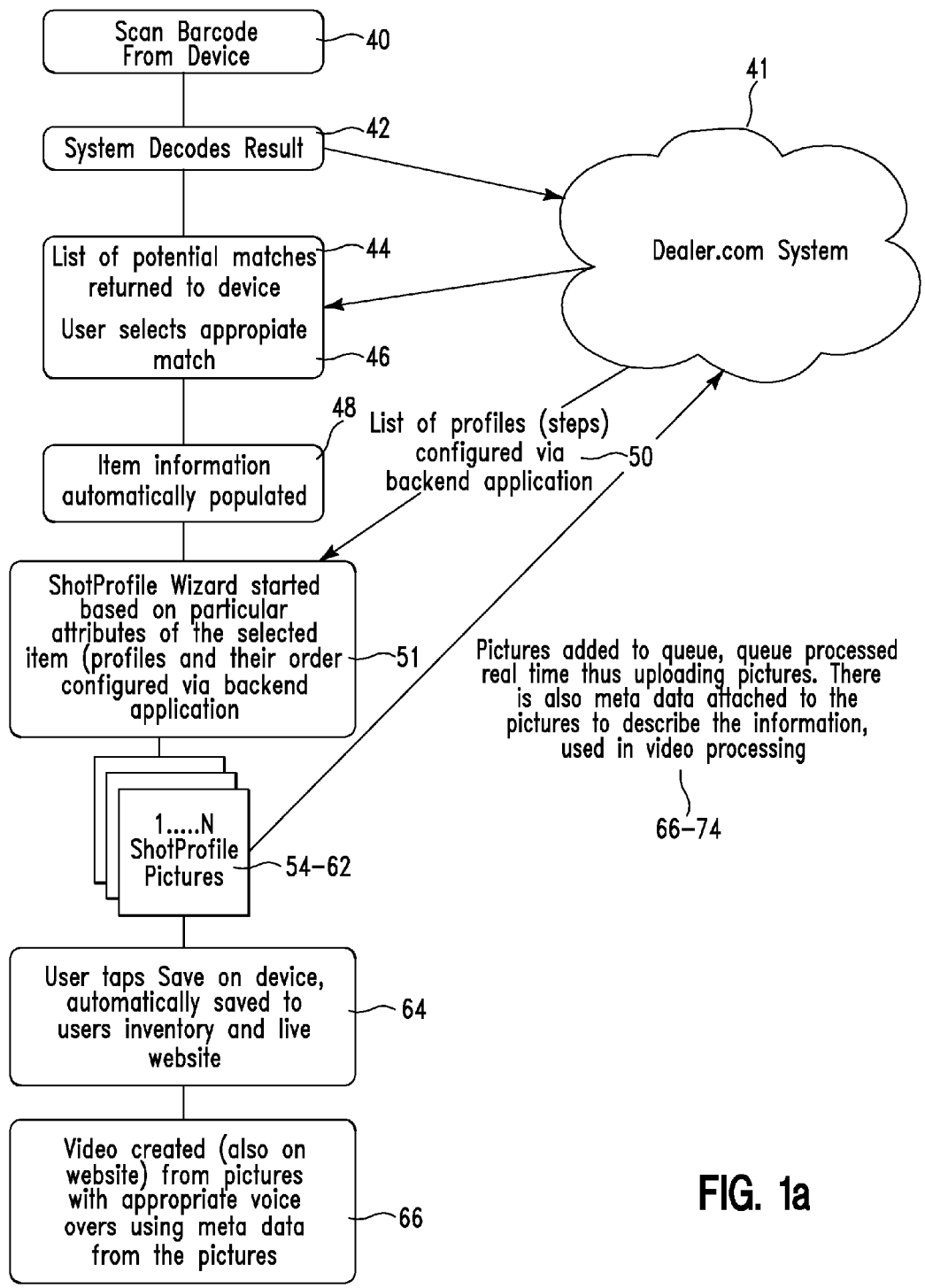
FIG. 1a is a flow chart illustrating one embodiment of a system that provides a uniform set of images of different products of the same type and combines that set of images with an automatically generated audio to create an audio-visual product description of a vehicle.

The present applicants created a system that provides a set of images for each product of a group of products, such as vehicles of a particular type on a dealer lot, so they all have substantially the same photographic views of the product. The images so obtained can then be provided to populate a web site so that a customer can compare different makes and models of that type of vehicle with consistent sequencing and photographic views.

In one embodiment, different types of vehicles, such as sedans and trucks, may have different sequencing and/or photographic views to illustrate features that may or may not be present for another type of vehicles. Within a particular type of vehicle the content and number of photographic views captured may depend on the presence or absence of certain attributes on the specific vehicle. For example certain models of a vehicle may have a specialized interior for which additional images may be captured than for models of that vehicle without that specialized interior.

A fairly complete set of attributes of a vehicle is available from information that resides electronically in a data base that can be accessed based on the particular vehicle's Vehicle Identification Number (VIN). The VIN may be used in embodiments of the present patent application to help determine which of several sets of photographic views are to be used.

In one embodiment, substantially the same views for all the vehicles of a particular type are obtained by providing a set of alignment features, such as ghost semi-transparent overlay structures on the screen of a digital imaging device to which the actual image of the vehicle on the screen is aligned before the image is captured. Alternatively, alignment features can include overlay outlines. In either case, an alignment feature for a vehicle includes an outline corresponding to the shape of the vehicle from a predetermined location or angle to which an actual image of the vehicle can be aligned, as further described herein below. They may include any number of views, including exterior views, interior views, an odometer view, an engine view, and underside views. The exterior views may include three-dimensional views from predetermined angles.

A variety of types of digital imaging devices, such as a digital camera, a smart phone, and a tablet computer can be used. In one embodiment, the digital imaging device can communicate with the internet or be connected for such communication.

In one embodiment, the order and number of images of the vehicle captured corresponds to the order and number of alignment features in the set of alignment features provided. The alignment features may themselves be derived from images of the vehicle captured from different angles or isolating different parts of the vehicle.

In one embodiment, a voice description of some of all of the images in the set is obtained by automatically providing a sequence of stitched together audio fragments that describe the particular features, or attribute values, of the specific vehicle as each of those attributes is viewed in an image of the set of images, as described in commonly assigned U.S. Pat. No. 8,112,279 ("the '279 patent"), incorporated herein by reference. In one embodiment described in the '279 patent, the voice description automatic creation scheme obtains the attribute values of each specific vehicle from information that resides electronically in the data base that can be accessed based on the particular vehicle's VIN.

In one embodiment the set of images obtained by the method of the present patent application is combined with audio obtained with the automatic audio generation scheme of the '279 patent to provide a detailed audio-visual description of the vehicle. While the present application illustrates the ideas of the applicants with reference to vehicles, such as automobiles and trucks, the ideas can be applied to other types of vehicles, such as buses, snow vehicles, boats and other water craft, airplanes and other types of aircraft, trains, and earth moving equipment. The ideas can also be applied to other types of products, such as industrial equipment, appliances, electronic devices, farm animals, and real estate.

In this patent application, the term "attribute" refers to a feature of a product that can be one of several choices.

The term "attribute value" refers to the specific one of the different choices of an attribute.

The term "voiceover product description" refers to a human voice audio description of a specific product.

The term "fragment" refers to one or more words intended to be spoken in order as part of a voiceover product description.

The term "audio fragment" refers to an audio file containing a fragment that was recorded by a human.

The term "stitch" as used in this patent application refers to the process of concatenating audio fragments, for example, to produce the voiceover product description. For stitching two or more audio fragments together the audio fragments and their order are specified and their contents stored in a single output file that includes all of the content from the audio fragments, non-overlapping, and in the specified order. The term stitch is also used referring to the similar process of concatenating video files.

The term "automatic" refers to a process executed by a computer with no human intervention.

The phrase "capture an image" refers to taking a picture and recording the image in a memory.

In one embodiment, a uniform set of product videos of all the new or used vehicles of a particular type on a dealer's lot can be obtained from the set of images of each vehicle obtained as described in this patent application combined with audio description of that vehicle obtained with the method of the '279 patent. For accomplishing this the attributes of each vehicle for both audio and images are found on an electronically available source based on a product identification code, such as the VIN. For other types of products, such as electronic devices, equipment, appliances, and real estate, the product serial number, product model number, or real estate code number could be used to locate product description information that resides electronically to obtain the attribute values and to determine the set of images to be captured.

Thus, under one embodiment of the present application built by the present applicants, a person uses a digital imaging device to capture the set of images of a particular vehicle according to the set of alignment features generated for that particular type of vehicle from the VIN. The entire video, with its audio and video tracks, is then automatically generated without further human involvement. Human input to answer questions about the product, to generate a script about the product, or to combine images with audio was avoided.

For example, using the system of the present patent application, the voiceover product description:
"This four door sedan features a four speed transmission and front wheel drive. It has a 2.4 liter engine, a sunroof, mag wheels, and a spoiler,"
can be built up from audio fragments found in separate audio recordings for each of the attributes while images of the vehicle corresponding to each attribute value mentioned are sequentially displayed as that attribute value is described.

For a new or a used car, much of the needed information may available electronically from the manufacturer based on VIN. Additional information can be added from online data bases, such as accident history. Other additional information can be provided electronically, such as when a used car is added to a dealer inventory data base, including VIN, mileage, whether the vehicle has any dents or scratches, dealer enhancements, and the set of images captured using the method of this patent application. Information in this dealer inventory data base can also be drawn upon for audio description creation. Thus, the full audio description can include up to date information about the used vehicle, such as, "this car has been driven fewer than 25,000 miles" while an image of the odometer is shown and "this car has dealer installed rust proof undercoating" while an image of the underside is shown.

The setup part of the process described in this patent application is performed by humans, and it provides voice recordings and directions for using the voice recordings that will be used to assemble the voiceover product descriptions for all the various specific products, as described in the '279 patent. The directions include specifying the contents of a common template and specifying rules for inclusion of audio fragments in the voiceover product description. The directions also include providing the images from the set of images captured by the dealer.

The automated part of the process is performed by a computer running software that can be configured to execute the automated steps for many different vehicles with no human intervention to provide a voiceover product description for each of the specific vehicles and the images that correspond in order and timing with the audio description.

More than one computer can be used to provide parallel processing and faster creation of the thousands of voiceover product descriptions of the images used to describe thousands of vehicles.

The present applicants recognized that the number of different car possibilities far exceeds the number of different variable elements for a car. For example, there are about 30 different car manufacturers and 3 different door configurations which gives 90 different car combinations possible for just those two attributes. Yet there are only 33 different individual attribute values.

An actual car can have about 50 different relevant attributes that might be of interest to a customer, and can be varied by the manufacturer or by the dealer, including year, manufacturer, model, color, body style, doors, transmission, wheel drive, engine type, engine size, number of cylinders, air conditioning, power sun roof, power windows, power windows, mirrors, and door locks, keyless entry, rain sensing wipers, spoiler, roof rack, upholstery, CD player, radio, antitheft devices, stability control, antilock brakes, and warrantee.

Since many of these attributes can be chosen independently of the others, this means that millions or billions of combinations of these 50 different relevant attributes can be chosen. However, even if there are an average of ten choices for each attribute value, for about 50 attributes there are only about 500 different individual attribute values altogether. Thus, by making only about 500 voice recordings the present applicants recognized that, with appropriate automatic stitching, they could create human voice descriptions of any of the possible car combinations. Based on the information in the data base for a particular VIN, appropriate ones of the 500 voice recordings can be selected and stitched together to automatically provide the description of any particular vehicle that can have any of those millions or billions of car possibilities. The present applicants recognized that they could therefore create a relatively small number of human voice recordings during setup and then, based on information obtained electronically from the VIN, automatically stitch together the appropriate voice recordings to make an accurate audio voiceover product description of any car or truck or for any other type of product. The set of images generated by the embodiments of this patent application can be combined with that voice recording to create the audio-visual product.

In the automatic steps described below, for a vehicle having a particular VIN, the computer will find the vehicle's attribute value for each attribute that appears in the common template. For example, the computer will find the actual model year of the particular vehicle, as provided in data residing electronically based on that particular VIN. The computer will apply rules to determine which audio fragments are applicable with that particular vehicle based on its attribute values. When the computer determines the model year of the vehicle with that particular VIN it will not include fragments in the result that indicate other model years.

The result of this step is a single "way" file with an authentic sounding human voice description of the vehicle. Based on the stitched together files, that voice description might say, "This 2008 Honda Accord has 4 doors and room for 5 passengers. It has less than 10,000 miles, an automatic transmission, front wheel drive, and a 3 liter, 6 cylinder engine. It features a power sun roof, rain sensing wipers, a CD player with MP3 capability, and stabilizers. Call now to take a test drive."

The ordered set of images captured of that vehicle with their carefully controlled angle and position are then stitched together with the audio to create audio-video footage.

In one embodiment an audio/video file containing video is kept as a video track while the automatically generated voiceover is kept as an audio track playing simultaneously.

Making images for each of a group of products so they all have substantially the same views is accomplished by providing a set of alignment features to a digital imaging device, such as a smart phone. The set of alignment features provided to the digital imaging device may be automatically determined—or at least narrowed down to particular choices that can be made by the photographer—based on the VIN.

In one embodiment that was created by the present applicants and shown in the flow chart of FIG. 1a the VIN is entered by scanning a barcode on the vehicle with the digital imaging device, as shown in box 40. The bar code information is transmitted by the digital imaging device to cloud based system 41 run by Dealer Dot Com, Inc., and the bar code information is there decoded, as shown in box 42. A list of potential matching vehicle types is returned to the digital imaging device, as shown in box 44. The photographer then selects one vehicle type from the list that matches the actual vehicle, as shown in box 46.

Based on that actual vehicle selection, attributes of the actual vehicle then populate a memory for that vehicle in cloud system 41, as shown in box 48. A set of alignment features appropriate for the vehicle type so determined is selected on cloud system 41, as shown in box 50. The alignment features included in the set by cloud system 41, and the order in which they are provided, is based on the type of vehicle selected. The set of alignment features may already be in a memory or the digital imaging device. Alternatively the alignment is transmitted to the digital imaging device from cloud system 41 for use in taking photographs of the vehicle with the digital imaging device, as shown in box 51 in FIGS. 1a, 1b.

The set of vector based semi-transparent overlay structures appropriate for each vehicle type with the desired sequence of views was created using an image manipulation application, Adobe Fireworks, as described in box 52. Pixelmator or another such program may also be used. The present applicants used libraries of existing stock photography of cars and trucks to prepare the stencils for the overlay structures. The image angles, perspectives, and zoom levels were determined by the images in these libraries of existing stock photography. Libraries of existing stock photography of cars and trucks are available from vendors such as Evox Images, Rancho Dominguez, Calif. Alternatively, other sources of images, 3D images, and videos can be used as stencils from which to start to determine useful angles or perspectives.

Export versions of the semi-transparent overlay structures appropriate for each vehicle type with the desired sequence of views were customized for various devices, such as iPad and iphone, which have different aspect ratios, so the overlay structures appropriately fit into the view screen of the digital imaging device as PNG's or JPG's or any other image type used by the plugin program running on the digital imaging device, as described in box 53. The image manipulation tool used, Adobe Fireworks, allows adjusting the size for each type of digital imaging device. Once the overlays were complete, they were loaded into an App for the plugin to use on the digital imaging device. The App may be downloaded from the internet.

On Apple products, Objective-C is a programming language that has a library that allows creation of a camera view and that allows insertion of a shot profile overlay into the view screen of the digital imaging device. It also allows adjusting the opacity setting so the viewer sees the semi-transparent ghosted view of the overlay. For Android products, Java is a programming language that has similar libraries. For other digital imaging devices, such as windows and Blackberry, other languages and libraries may be used. A similar process is used if the alignment features are made with an overlay outline or with a semi-transparent ghosted view.

Figure 1B:
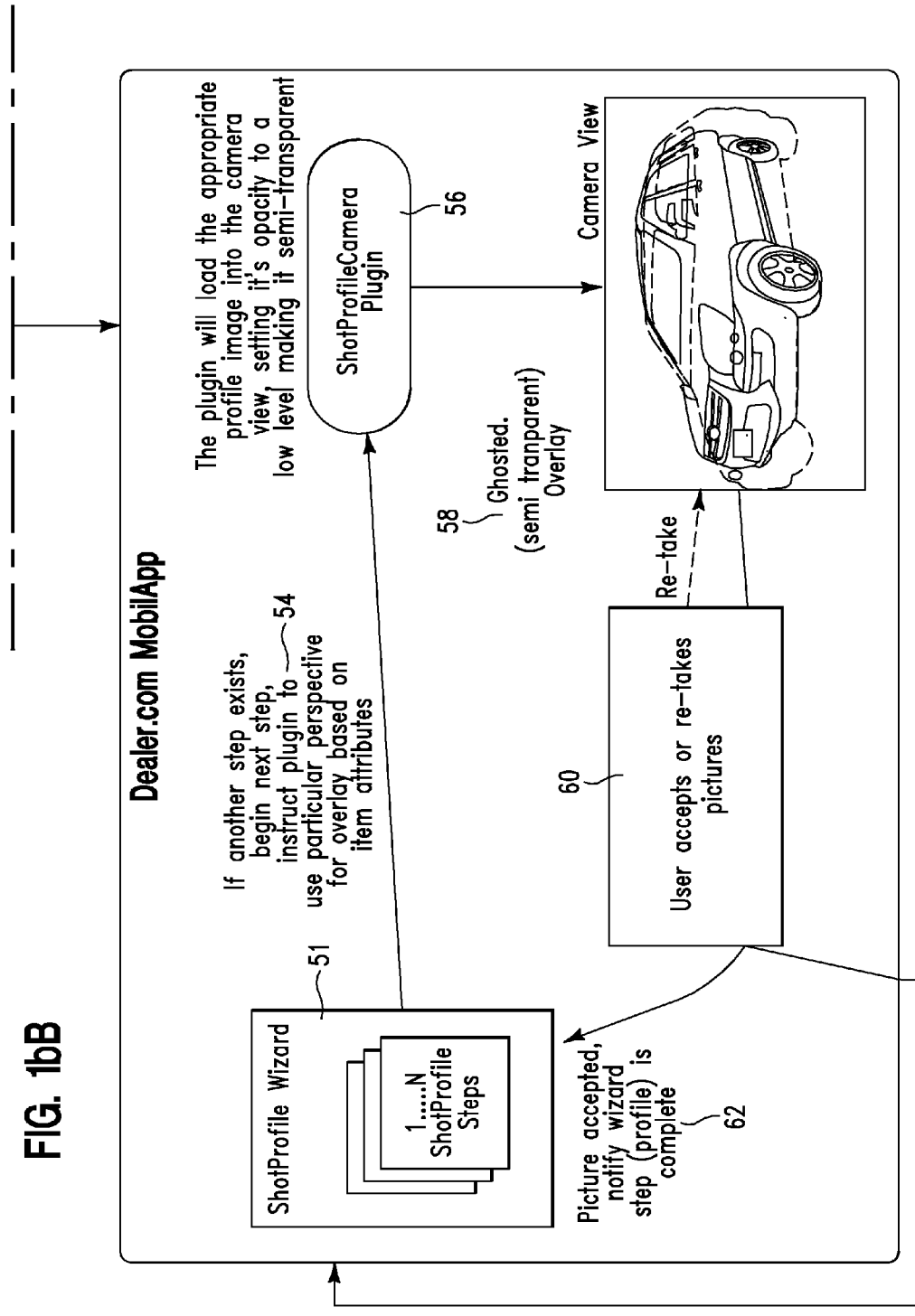
FIG. 1b provides more detail to the flow chart of FIG. 1a for the portion that is used to create a set of images of the product.
Figure 1B:
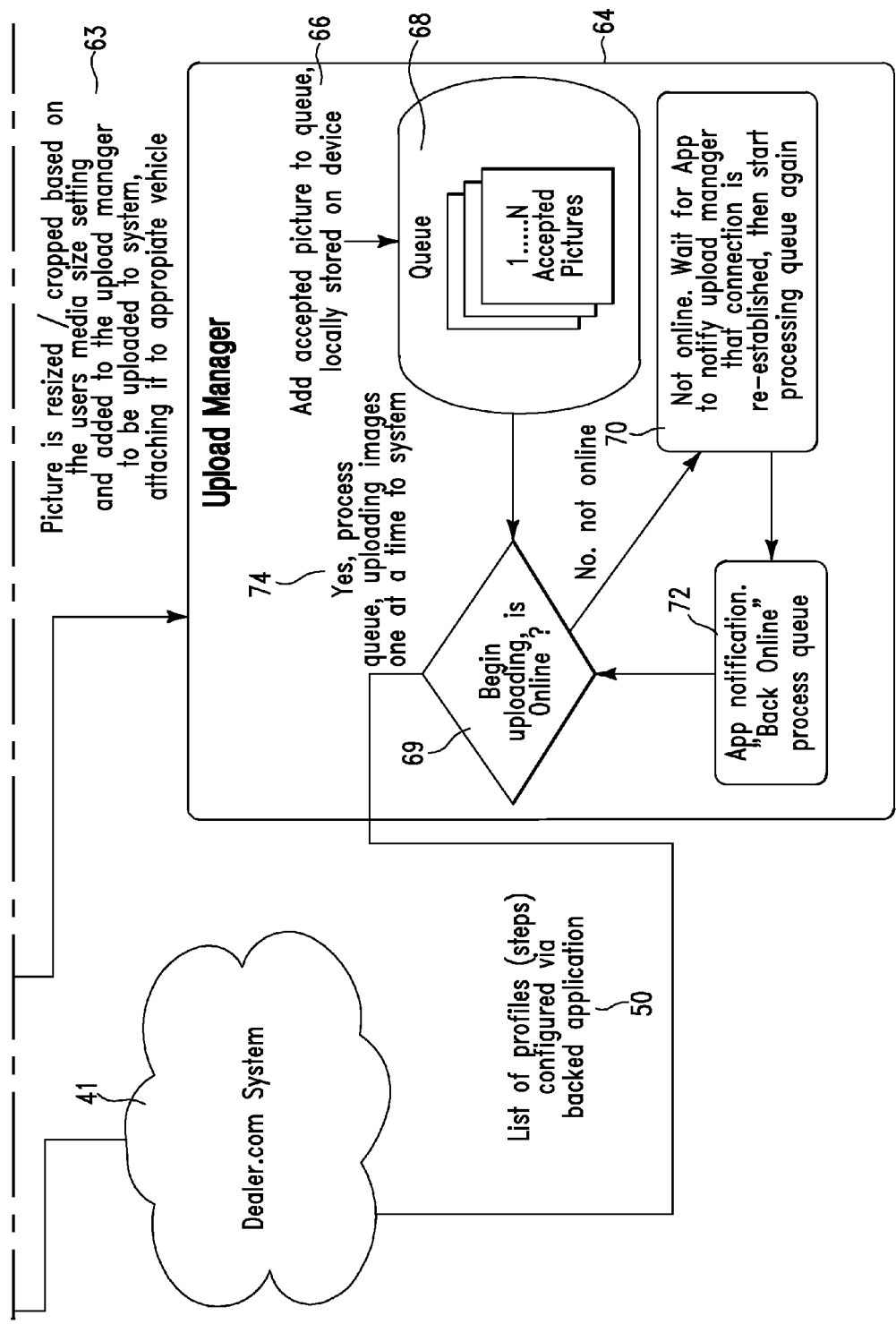

Cloud system 41 runs a program that calls up the first of the set of alignment features for display on the screen of the digital imaging device, as shown in boxes 54 and 56 in FIG. 1*b*.

Figure 2A:
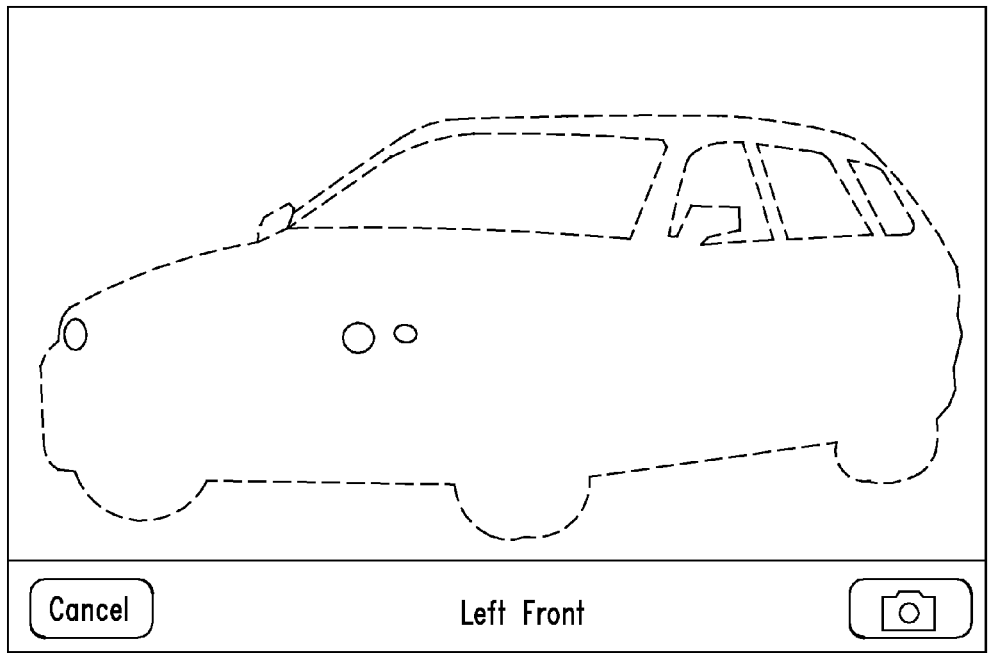
FIGS. 2a, 3a are views of a screen of a digital image device showing examples of ghost semi-transparent overlay structures.
Figure 2B:
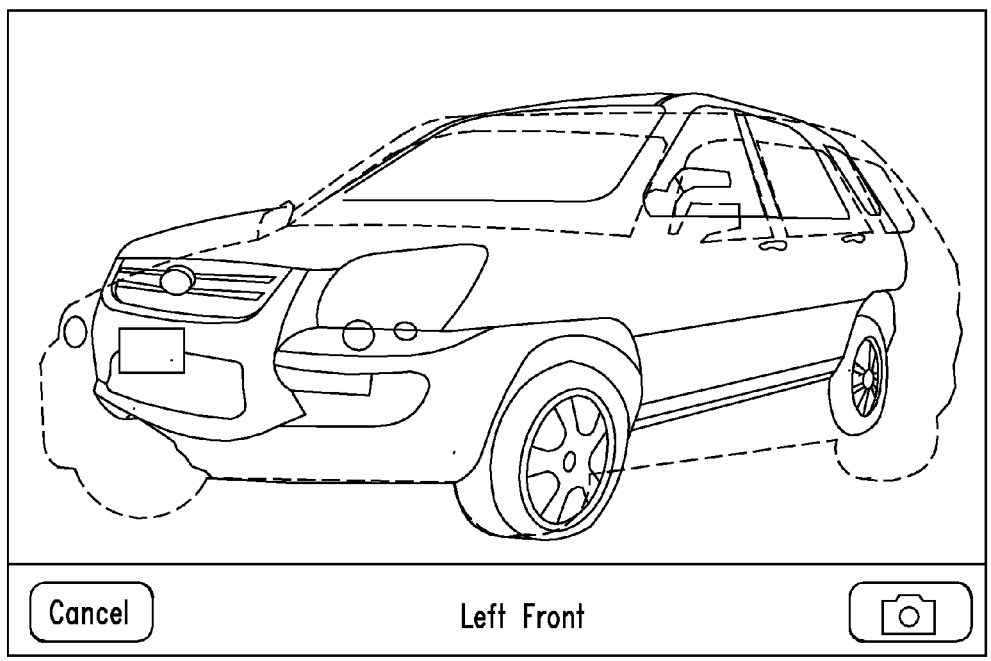
Figure 3A:
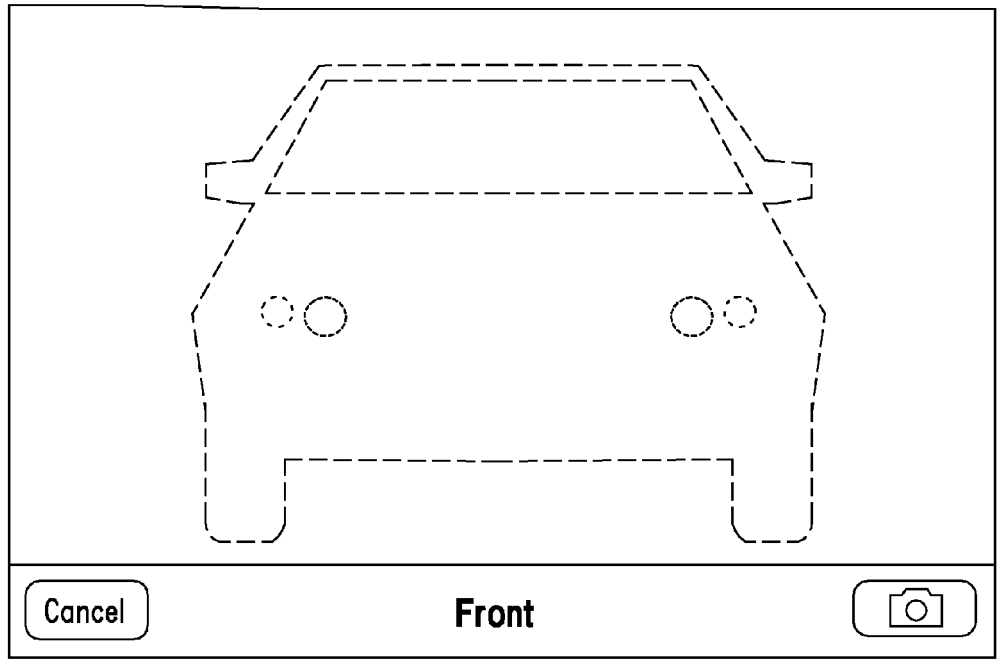
Figure 3B:
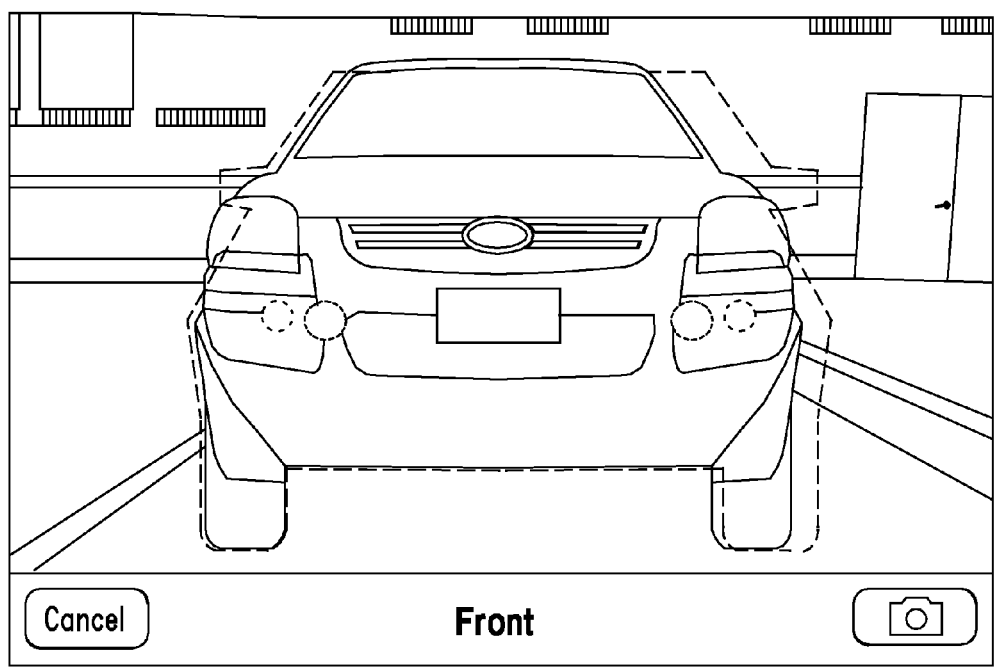

After the first of the alignment features is displayed on the screen of the digital imaging device, as shown with ghost semi-transparent overlay structures in FIGS. 2*a*, 3*a*, the first image of the vehicle may be captured. The photographer positions the digital imaging device so that the actual vehicle fits in the ghost semi-transparent overlay structure alignment feature, as shown in box 58 and in FIGS. 2*b*, 3*b*. Positioning the digital imaging device, orientation of the digital imaging device, and focal length of the imaging lens of the digital imaging device may be used to align the actual image of the vehicle on the screen with the alignment feature on the screen. The photographer then captures the image. Capturing the image with the digital imaging device so positioned provides a recorded image of the vehicle defined by the angle, distance, and shape of the alignment feature. The photographer then reviews the image and either accepts or rejects it, as shown in box 60. If the image is accepted, as shown in box 62, the App program running on the digital imaging device is notified and the App then repeats the steps for the next alignment feature, as shown in boxes 51 and 54-62.

In an alternative embodiment, the digital imaging device can be programmed to automatically capture the image when the actual image of the vehicle is correctly positioned on the screen in the alignment feature. This can be accomplished by having the digital imaging device capture a series of images and as each is captured measuring the difference between location of the actual image and the alignment feature and continuing to capture images until the difference around the perimeter of the semi-transparent overlay structure is within a pre-specified tolerance. That captured image is then retained and the others discarded.

The process sequence of boxes 54 to 62 is repeated for each alignment feature in the set of alignment features until all the alignment features in the set for that vehicle type have been used to capture images. Thus, a set of images of the particular vehicle is created in which each was obtained at a predetermined angle and distance from the car or location in or under the or viewing the engine of the vehicle corresponding to that provided by the alignment features. In this way sets of images of vehicles of the same type have substantially the same views to a high level of correspondence.

In one embodiment, once all the images corresponding to all the alignment features have been captured and accepted by the photographer, the photographer taps save on the device, the image files are automatically resized, as shown in box 63, and the image files are uploaded for saving to the dealer inventory and/or to a live website, both provided by system 41, as shown in box 64, as shown in FIGS. 2*a*, 2*b*.

In one embodiment, uploading to system 41 for dealer inventory and/or live website involves a webload manager that adds accepted pictures to a queue locally stored on the device, as shown in boxes 66 and 68. The App then checks whether the device is connected to the internet, as shown in box 69. If not, as shown in box 70, the upload manger waits until the App notifies it that connection is established or re-established, as shown in box 72 and starts or restarts uploading from the queue to the server, as shown in box 74. Thus, the plurality of images is uploaded from a queue of images while retaining each of the images in the queue until that image has been successfully uploaded.

Video footage is then created on the website from the images combined with the appropriate audio fragments, as described herein above and in the '279 patent and shown in box 66. In one embodiment, meta data provided with the images that identify what attribute is shown may be used to direct the order of the audio fragments that are then stitched together. In another embodiment, images showing attributes of the vehicle are ordered according to the sequence provided by the template used for creation of the audio fragments. In either of these embodiments, time for showing each image in the video is determined by the time of the audio fragment used for describing the attribute shown in that photo.

While several embodiments, together with modifications thereof, have been described in detail herein and illustrated in the accompanying drawings, it will be evident that various further modifications are possible without departing from the scope of the invention as defined in the appended claims. Nothing in the above specification is intended to limit the invention more narrowly than the appended claims. The examples given are intended only to be illustrative rather than exclusive.

What is claimed is:

1. A method of taking an image of a scene that includes an item of interest, wherein said item of interest has one of a plurality of item types, comprising:
   a. providing a plurality of sets of alignment features, wherein each set of alignment features is appropriate for one of the plurality of item types;
   b. selecting a set of alignment features appropriate for the item of interest from the plurality of sets of alignment features;
   c. providing a digital imaging device having an imaging lens and a viewing screen;
   d. electronically providing a first alignment feature from said selected set of alignment features on the viewing screen, wherein said first alignment feature is configured to allow a viewer to see both said first alignment feature and an image of the item of interest on the viewing screen;

e. adjusting at least one parameter from the group consisting of angular position of said digital imaging device with respect to the item of interest and angular orientation of said digital imaging device to achieve alignment of said image of the item of interest on said viewing screen with said first alignment feature, wherein said first alignment feature has a structure so that said adjusting to achieve alignment restricts to exclusively one angular position of said digital imaging device with respect to the item of interest and exclusively one angular orientation of the digital imaging device, wherein said first alignment feature has a first alignment feature shape that is substantially the same as shape of the item of interest image when the digital imaging device is in a predetermined angular position with respect to the item of interest and when the digital imaging device has a predetermined angular orientation;

f. capturing the image of the item of interest when said alignment has been achieved; and g. sequentially providing alignment features of said set of alignment features on the screen, adjusting said at least one parameter for each said alignment feature, and capturing an image of the item of interest for each said alignment feature when said image of the item of interest is aligned with said alignment feature to obtain a plurality of captured images of the item of interest.

2. A method as recited in claim 1, further comprising adjusting size of said item of interest image on said viewing screen, wherein said alignment feature has a sizing structure so that adjusting to achieve alignment with said sizing structure restricts to exclusively one size of said item of interest image on said viewing screen.

3. A method as recited in claim 2, wherein said adjusting size of said item of interest image on said viewing screen involves at least one from the group consisting of adjusting radial position of said digital imaging device with respect to said item of interest and adjusting focal length of said imaging lens.

4. A method as recited in claim 1, wherein said alignment feature includes a three dimensional view of said item from a predetermined angle.

5. A method as recited in claim 1, wherein said alignment feature includes an outline of a view of said item from a predetermined angle.

6. A method as recited in claim 1, wherein said item of interest includes a vehicle and wherein said alignment feature includes a view of the vehicle from a predetermined angle.

7. A method as recited in claim 6, wherein the vehicle includes at least one from the group consisting of a car, a van, a truck, a bus, a recreational vehicle, a two wheeled vehicle, a water craft, and an aircraft.

8. A method as recited in claim 6, wherein said alignment feature includes at least one from the group consisting of a front view, a rear view, a front right view, a front left view, a rear right view, a rear left view, an odometer view, and an interior view.

9. A method as recited in claim 1, further comprising uploading said plurality of captured images of the item of interest for viewing on the internet.

10. A method as recited in claim 9, further comprising providing metadata with each of said captured images of the item of interest.

11. A method as recited in claim 10, wherein said metadata includes an identifier for each captured image of the item of interest, wherein said identifier is related to said alignment feature for that captured image.

12. A method as recited in claim 9, further comprising providing a server accessible with a password, wherein said uploading involves accessing said server and saving the captured images of the item of interest on the server.

13. A method as recited in claim 9, wherein said uploading said plurality of images of the item of interest includes providing a queue of said plurality of images of the item of interest and retaining a particular one of said plurality of images of the item of interest in said queue until that image of the item of interest has been successfully uploaded.

14. A method as recited in claim 1, wherein said capturing an image of the item of interest involves said digital imaging device automatically capturing said image of the item of interest when alignment of said image of the item of interest on said viewing screen with said alignment feature is achieved.

15. A method as recited in claim 1, further comprising providing a voiceover product description of said item of interest and combining said voiceover product description with a plurality of said images of the item of interest.

16. A method as recited in claim 15, wherein said item of interest is a particular product of a class of products, and wherein said providing said voiceover product description includes:

a. providing a plurality of human voice recordings, wherein each said human voice recording includes audio corresponding to an attribute value common to many of the products;

b. automatically obtaining attribute values of the particular product, wherein said attribute values reside electronically;

c. automatically applying a plurality of rules for selecting a subset of said human voice recordings that correspond to said obtained attribute values; and d. automatically stitching said selected subset of human voice recordings together to provide a voiceover product description of the particular product.

17. A method as recited in claim 16, further comprising repeating b, c, and d of claim 16 for a plurality of said particular products.

18. A method as recited in claim 17, wherein other than said capturing an image of the particular product for each of said alignment features to provide a plurality of images of the particular product, said repeating is executed by a computer with no human involvement.

19. A method as recited in claim 16, wherein the class of products includes at least one from the group consisting of vehicles, appliances, electronic devices, and real estate.

20. A method as recited in claim 16, further comprising providing an identification code to automatically obtain said attribute values that reside electronically.

21. A method as recited in claim 20, wherein said identification code includes at least one from the group consisting of a VIN, a product model number, a product serial number, and a real estate code.

22. A method as recited in claim 20, wherein said providing an identification code involves scanning a barcode.

23. A method as recited in claim 16, wherein said automatically obtaining said attribute values involves obtaining said attribute values from a database.

24. A method of building a description of a particular product of a class of products on a website, wherein the website is on a server, comprising:

a. providing a plurality of sets of alignment features, wherein each set of alignment features is appropriate for one of the class of products;
b. reading a code on the particular product and transmitting data derived from said reading;
c. determining information about the particular product from said transmitted data;
d. selecting a set of alignment features from the plurality of sets of alignment features based on said information;
e. providing a digital imaging device, wherein said digital imaging device includes a viewing screen;
f. providing an alignment feature on said viewing screen from said selected set of alignment features, adjusting at least one parameter from the group consisting of angular position of said digital imaging device with respect to the particular product and angular orientation of said digital imaging device to achieve alignment of said image of the particular product on said viewing screen with said alignment feature, wherein said alignment feature has a structure so that said adjusting to achieve alignment restricts to exclusively one angular position of said digital imaging device with respect to the particular product and exclusively one angular orientation of the digital imaging device, wherein said alignment feature has a first alignment feature shape that is substantially the same as shape of the particular product when the digital imaging device is in a predetermined angular position with respect to the particular product and when the digital imaging device has a predetermined angular orientation;
g. repeating said adjusting location of said digital imaging device and capturing an image of the particular product when said image of the particular product is aligned with said alignment feature for each of a plurality alignment features of said set of alignment features to obtain a plurality of captured images of the particular product; and
h. transmitting said plurality of captured images of the particular product to a web site.

25. A method as recited in claim 24, wherein said reading a code involves scanning a barcode.

26. A method as recited in claim 24, wherein said particular product includes a vehicle.

27. A method as recited in claim 24, wherein said transmitting involves transmitting said captured images of the particular product to the server.

28. A method as recited in claim 24, wherein said digital imaging device includes one from the group consisting of a smart phone and a tablet computer.

29. A non-transitory computer-usable medium having computer readable instructions stored thereon for execution by a processor to perform a method of capturing an image of a scene that includes an item of interest, wherein said item of interest has one of a plurality of item types, comprising:
a. providing a plurality of sets of alignment features, wherein each set of alignment features is appropriate for one of the plurality of item types;
b. selecting a set of alignment features appropriate for the item of interest from the plurality of sets of alignment features;
c. providing a digital imaging device having an imaging lens and a viewing screen;
d. electronically providing a first alignment feature from said selected set of alignment features on the viewing screen, wherein said first alignment feature is configured to allow a viewer to see both said first alignment feature and an image of the item of interest on the viewing screen;
e. adjusting at least one parameter from the group consisting of angular position of said digital imaging device with respect to the item of interest and angular orientation of said digital imaging device to achieve alignment of said image of the item of interest on said viewing screen with said first alignment feature, wherein said first alignment feature has a structure so that said adjusting to achieve alignment restricts to exclusively one angular position of said digital imaging device with respect to the item of interest and exclusively one angular orientation of the digital imaging device, wherein said first alignment feature has a first alignment feature shape that is substantially the same as shape of the item of interest image when the digital imaging device is in a predetermined angular position with respect to the item of interest and when the digital imaging device has a predetermined angular orientation;
f. capturing the image of the item of interest when said alignment has been achieved; and
g. sequentially providing alignment features of said set of alignment features on the screen, adjusting said at least one parameter for each said alignment feature, and capturing an image of the item of interest for each said alignment feature when said image of the item of interest is aligned with said alignment feature to obtain a plurality of captured images of the item of interest.

* * * * *